March 1, 1966  W. LOHRAND ETAL  3,237,499
ROLLER DIE PRESS CUTTER APPARATUS WITH AUTOMATIC ROLL LIFT
Filed July 17, 1964  4 Sheets-Sheet 1

INVENTORS
WILLIAM LOHRAND
DAVID C. WRIGHT
BY Oldham & Oldham
ATTYS.

March 1, 1966     W. LOHRAND ETAL     3,237,499
ROLLER DIE PRESS CUTTER APPARATUS WITH AUTOMATIC ROLL LIFT
Filed July 17, 1964     4 Sheets-Sheet 3

INVENTORS
WILLIAM LOHRAND
DAVID C. WRIGHT
BY Oldham & Oldham

ATTYS.

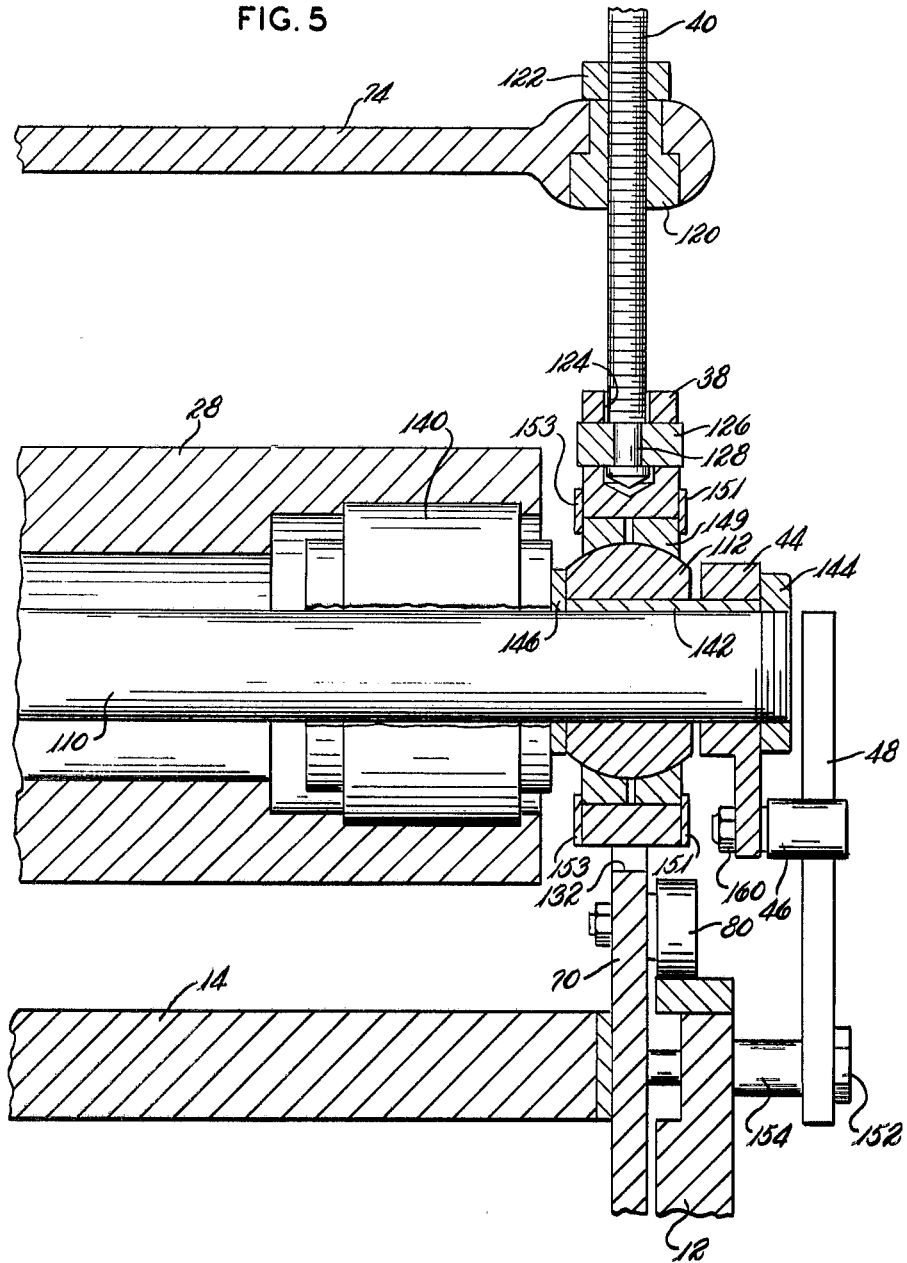

3,237,499
ROLLER DIE PRESS CUTTER APPARATUS WITH
AUTOMATIC ROLL LIFT
William Lohrand, Barberton, and David C. Wright,
Cuyahoga Falls, Ohio, assignors to The Falls Engineering and Machine Company, Cuyahoga Falls, Ohio, a corporation of Ohio
Filed July 17, 1964, Ser. No. 383,423
6 Claims. (Cl. 83—510)

This invention relates to a roller die press cutter apparatus having an automatic roll lift after the cutting stroke, and more particularly to a roller die cutting apparatus wherein the roller is eccentrically mounted to facilitate the automatic lift after the rolling cutting stroke, and wherein such roller is also vertically adjustable.

Heretofore, it has been known that there have been many and various types of roller die cutting presses. However, these prior art presses have been characterized by being extremely large, cumbersome, heavy and expensive. They have not been adaptable to quick accurate work on a small scale where large productive requirements are necessary. Further, these prior art roller die cutters have not include automatic means for lifting the roller out of cutting contact at the completion of the cutting roll stroke so that the roller can be returned to its initial position quickly without additional improper cuts made on the material. It is well known that a roller die cutting press which passes the roller first in one direction over the die and then back in the other direction will effect slight variations in cuts causing slivers and slight irregularities in the desired die pattern on the material to be cut.

The roller die press has proved to provide better cutting on a more accurate basis than that possible utilizing the old type uniform press or a clicker die press. The roller die press eliminates the jarring shock loads of the clicker die press. Heretofore, it has not been believed possible to make a small roller die press that is easily manageable, highly accurate in operation, and inexpensive to construct.

Therefore, it is the general object of the present invention to avoid and overcome the foregoing and other difficulties of and objections to prior art practices, and to meet the needs of the art, by the provisions of a roller die cutter press apparatus which is made on a small scale for individual machine operator control which utilizes a cutting die mounted in a pivotal die chase counterweighted for operator ease to be lowered against a material placed on a horizontal bed with a rotatable roll mounted in a movable carriage passing over the back of the die chase to apply point contact cutting pressure to the cutting die to cut the material which apparatus is inexpensive, highly accurate in operation, and extremely simple to control by a single operator.

Another object of the invention is to provide a roller die press cutting apparatus where once the dies are in position on the material to be cut a steel roll operatively carried by a traversing carriage passes in one direction over the back of the dies applying point-contact cutting pressure and forcing the die edges through the material and which roll is automatically moved upwardly away from the backs of the dies at the end of the pass so that the roll may be returned to its initial position without effecting further point-contact cutting pressure on the die edges.

A further object of the invention is to provide a roller die press cutter apparatus wherein a traversing steel roll used to effect cutting pressure on die edges is rotatably mounted on a shaft which is eccentrically mounted in rotatable cams to a traversing carriage so that rotation of the shaft moves the roll into or out of applying point-contact cutting pressure forcing the die edges through material desired to be cut.

A further object of the invention is to provide a roller die apparatus wherein the die chase adapted to carry the cutting dies is pivotally mounted and counterweighted for operator ease to enable an increase in output production by the apparatus.

Another object of the invention is to provide a roller die cutting apparatus wherein the roller cutting pressure is easily and accurately controlled by adjustable screws on both ends of the roll.

The aforesaid objects of the invention and other objects which will become apparent as the description proceeds are achieved by providing in a roller die apparatus the combination of a table, a bed carried by the table, means to position a cutter die in face to face complementary relation to the bed, a carriage supported on each end at opposite sides of the table and movable relative thereto the length thereof, a pair of eccentric cams rotatably mounted in opposed relationship on each side of the carriage and adjustable in perpendicular relation to the bed, an elongated shaft keyed at each end to a respective cam and positioned in substantially parallel relation to the bed across the width thereof, a roller rotatably carried by the shaft and extending substantially the length thereof, means to drive the carriage relative to the bed the length thereof when the cams position the shaft in a minimum perpendicular spaced adjacent relation to the bed so that the roller sequentially forces the cutter die into a point contact cutting relation with the bed, and means to rotate the shaft through an arc after the carriage has moved the length of the bed to move the shaft perpendicularly away from the bed so that the carriage can return to the initial position without having the roller force the cutter die into point-contact cutting relation with the bed.

For a better understanding of the invention reference should be had to the accompanying drawings, wherein:

FIGURE 5 is an enlarged vertical cross sectional view of the roller, eccentric mounting and vertical adjustable means taken substantially on line 5—5 of FIGURE 4.

Figure 1:
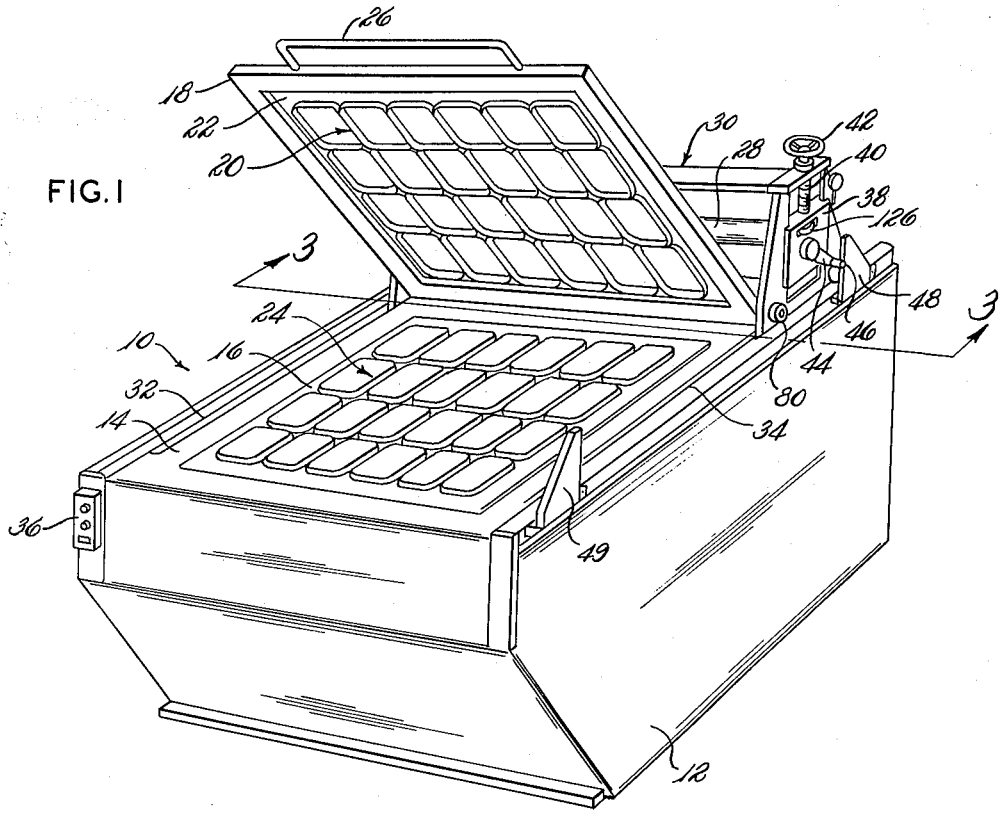
FIGURE 1 is a perspective view of a preferred embodiment of the invention.

With reference to the form of the invention illustrated in FIGURE 1 of the drawings, the numeral 10 indicates generally a roller die cutter press comprising the embodiments of the invention which consists of a frame or table 12 mounting a bed 14 in substantially horizontal relationship thereto. The bed 14 operatively receives a cutting board 16, conventionally made from plywood, or a soft metal. A pivotally mounted die chase 18 operatively carries cutting dies, indicated generally by numeral 20 which are mounted to a carrying board 22 operatively held in position in relation to the die chase 18. Conventionally, the board 22 may be made from plywood, or again some softer metal. The die chase 18 is pivotal to a face to face complementary relationship with respect to the board 16 so that a material placed in position on the board 16 will be cut to individual patterns, indicated by numeral 24, by the dies 20 as more fully described hereinafter. The die chase 18 may be moved into face to face complementary relationship manually by a machine operator pulling down on a handle 26. It is contemplated that the die chase 18 will be counterweighted, as more fully described hereinafter, to facilitate machine operation where heavy die patterns are utilized.

Once the die chase 18 has been moved into face to face adjacent relationship over the board 16 on the bed 14, a steel roll 28 rotatably carried by a carriage assembly, indicated generally by numeral 30, is passed over the top or back side of the die chase 18 as the carriage assembly 30 is driven along parallel tracks 32 and 34 in the bed 14 to effect a point-contact cutting pressure onto the dies 20 in relation to the cutting board 16. This relative movement and construction of the carriage 30 will be more fully described hereinafter. However, suffice it to say at this point, that the movement of the carriage 30 in both directions is effected by an electric motor which is controlled by an on-off, forward-reverse switch 36 located on the front portion of the apparatus 10. The roll 28 is rotatably mounted to a shaft, not seen in FIGURE 1, which is eccentrically mounted in rotatable cams received in vertically sliding blocks 38. The blocks 38 are vertically adjustable by screws 40 operated by hand wheels 42. An arm 44 is operatively connected to the shaft rotatably mounting the roll 28, as will be more fully described hereinafter, which arm 44 carries a rotatable handle 46 adapted to engage limit stops 48 and 49 at the ends of the movement of the carriage assembly 30. The movement of the arm causes an arcuate rotation to the shaft mounting the roll 28 which, because of the eccentric mounting, which is more fully described hereinafter, causes an upward or downward movement of the roll 28 depending upon which way the arm 14 is rotated.

Figure 2:
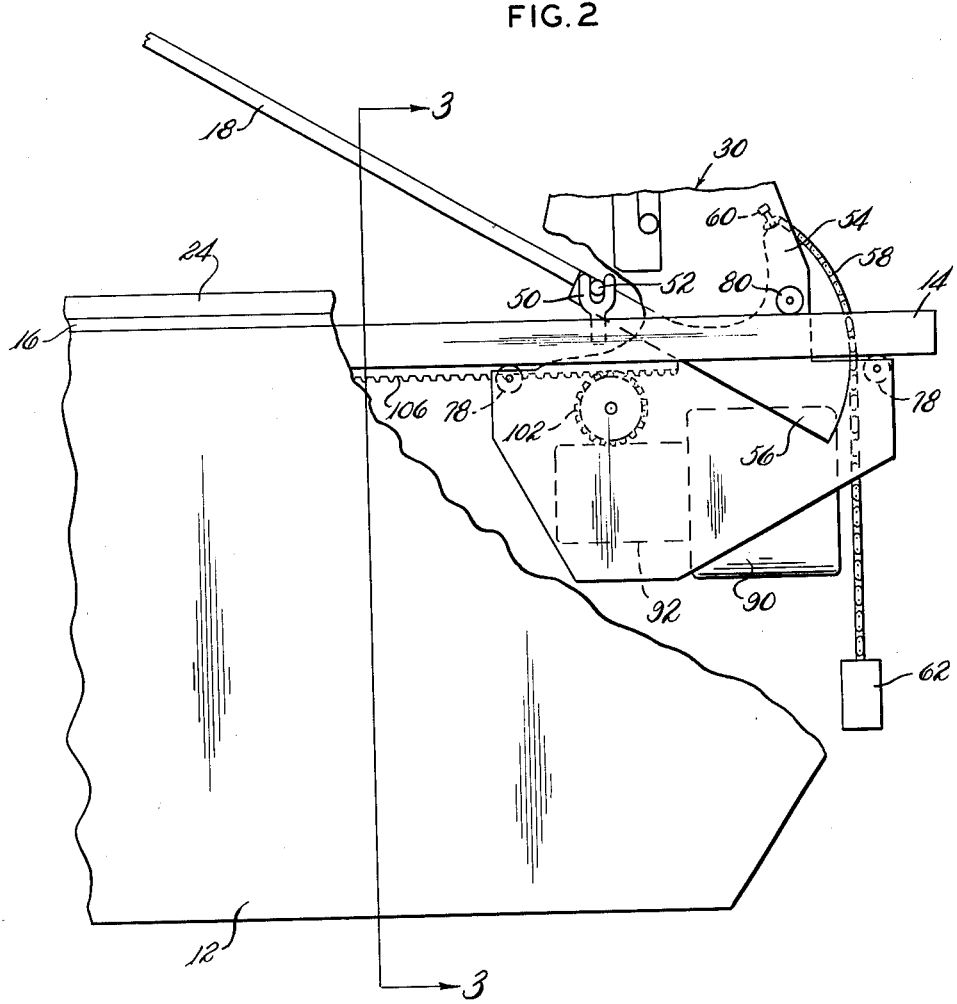
FIGURE 2 is an enlarged broken away view of the carriage assembly, drive means and the pivotally mounted die chase to more clearly show the relationship of these parts.
Figure 3:
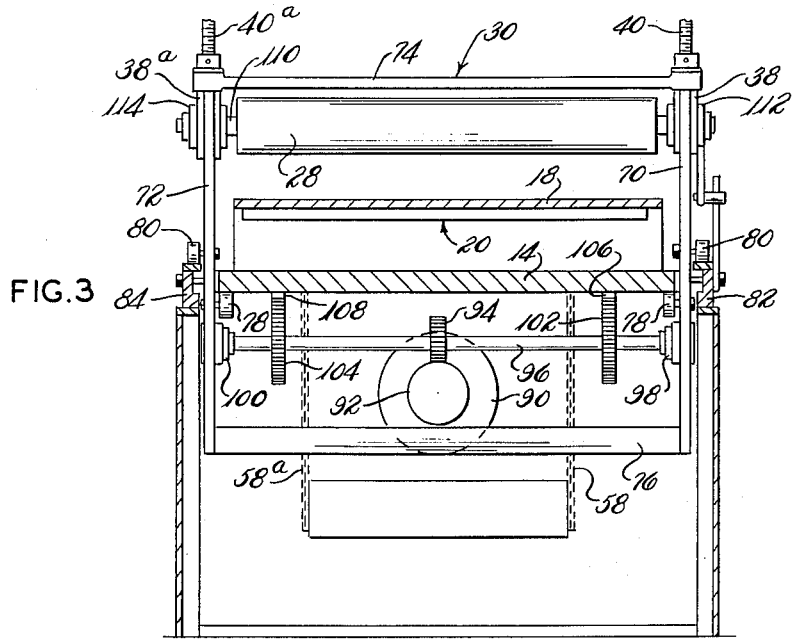
FIGURE 3 is a vertical cross sectional view of the roller die cutter apparatus taken on line 3—3 of FIGURE 1.

For a better understanding of the carriage assembly 30, and the pivotal mounting of the die chase 18, reference should be had to FIGURE 2 wherein it is seen that the die chase 18 is pivotally mounted on either side by U-shaped or bifurcated clevis pins 50 which slidably receive an outwardly extending pin 52 operatively carried by the die chase 18. The clevis pins 50 are fixedly positioned into the bed 14. Note the relationship of the cutting board 16 and the material 24 with relation to the bed 14. Although only one clevis pin 50 is shown in FIGURE 3, it should be understood that at least one other clevis pin is located on the opposite side of the die chase 18, while it may be desirable to locate other clevis pins across the width at the desired pivotal point. The pin 52 on the die chase 18 is of slightly less diameter than the slot in the pin 50 so as to allow the die chase 18 to move vertically to adjust to various thicknesses of material 24. An arm 54 is operatively affixed to the die chase 18 and extends in an opposite direction thereto from approximately the point of the pivot pin 52. The arm 54 has an arcuately shaped outer surface 56 which receives a link chain 58 operatively mounted at one end of the arcuate portion 56 by a bolt 60 and which extends downwardly and is attached to a weight 62 at the other end. This achieves the counterweighting effect to the die chase 18 as described heretofore. Actually, the invention contemplates that there will be two arms 54 carrying two chains 58 and 58a, as seen in FIGURE 3. The invention further contemplates that more or less weight than the weight 62 could be added or taken away to provide accurate counterbalance for the die chase 18, as determined by the weight of the cutting dies actually carried.

The carriage assembly 30 actually consists of a pair of opposed side plates 70 and 72 slidably received in parallel relation in the slots 32 and 34 of the bed 14. The plates 70 and 72 are operatively held in position by a top cross bar 74 and a bottom brace 76, as best seen in FIGURE 3. In order to maintain the plates 70 and 72 in a proper relationship with respect to the bed 14, a plurality of rollers 78 are operatively mounted to the plates and engage the bottom side of the bed 14. Likewise, another group of rollers 80 operatively affixed to the plates engage the top side of extended frame support portions 82 and 84, respectively. Thus, it is seen that the plates 70 and 72 are rather securely mounted in slidable relation with respect to the length of the bed 14.

In order to drive the carriage assembly 30 with respect to the bed 14, a drive motor 90 operatively mounted to the bottom brace 76 of the carriage assembly 30 drives a gear reduction box 92 which engages a spur gear 94 mounted to a shaft 96 which is rotatably journalled at both ends in bearings 98 and 100, respectively, operatively carried in plates 70 and 72, respectively. Therefore, it is seen that rotation of the motor 90 by suitable electrical energization will effect rotation of the shaft 96. A pair of spur gears 102 and 104, respectively, engage racks 106 and 108, which are secured to the bed 14. The racks 106 and 108 actually extend the length of the bed 14 so that the carriage assembly 30 may be driven the full length thereof.

The steel roll 28 is mounted in rotatable relation to a central shaft 110. The shaft 110 is mounted at both ends in eccentric cams 112 and 114, which are rotatably mounted in slidable blocks 38 and 38a. As stated above, the blocks 38 and 38a are adjustable vertically in relation to the side plates 70 and 72 by screws 40 and 40a. The cams 112 and 114 are actually formed as spherical balls which act as self-aligning bearings if the roll 28 is run at an angle with respect to the bed 14 of the press 10.

As best seen in FIGURE 5, the screw 40 is received through a threaded member 120 operatively mounted in fixed relation to the top plate 74. The screw 40 may be locked in relation to the threaded member 120 by a threaded locking collar 122. The screw 40 extends through a receiving hole 124 in the slidable block 38 and carries a collar 126 rotatable around a recessed portion 128 on the screw 40. The collar 126 is slidably received in a slot 130 in the block 38 so that it must remain in fixed relationship thereto. Therefore, it can be seen that rotation of the screw 40 moves it up and down in relation to the top cross bar 74. Thus, rotation of the screw 40 actually slides the slidable block 38 up and down in a receiving window 132 in the side plate 70. A conventional bifurcated sliding relationship can be achieved between the sliding block 38 and the receiving slot 132 of the side plate 70.

FIGURE 5 clearly shows the eccentric mounting of the shaft 110 with relation to the sliding block 38. Note the roll 28 is rotatably mounted to the shaft 110 by the bearing 140. A similar bearing will rotatably mount the other end of the roll 28. The eccentric cam 112 is keyed to the shaft 110 by an extending key 142. The actuation arm 44 is also held in keyed relationship to the shaft 110 by the key 142. A locking nut 144 may be threadably received on the end of the shaft 110 to hold the assembly into fixed position. A washer 146 may be positioned between the bearing 140 and the eccentric cam 112 to facilitate movement between these adjacent parts. It should be seen, particularly with reference to FIGURE 4, that the eccentric cam 112 is shown with the thickest portion in the up position which actually positions the shaft 110 in a minimum spaced relationship with respect to the bed 14. The eccentric cam 112 is actually rotatable with respect to the sliding block 38 because it is mounted in a complementary receiving bearing 149, which bearing 149 is held in position by locking rings 151 and 153, respectively.

It should be noted that the actuating handle 46 is secured to the arm 44 in a rotatable manner by a nut 160. The actuating handle 46 protrudes a sufficient distance to engage the limit stop 48. The limit stop 48 may be secured to the frame or table 12 by a bolt 152 passed through a spacer sleeve 154. The bolt 152 may also be utilized to secure the position of the bed 14 with respect to the table or frame 12. It is only necessary to have the arm 44 on one end of the shaft 110 since rotation of the shaft is all that is necessary and the single arm 44 provides this feature.

Figure 4:
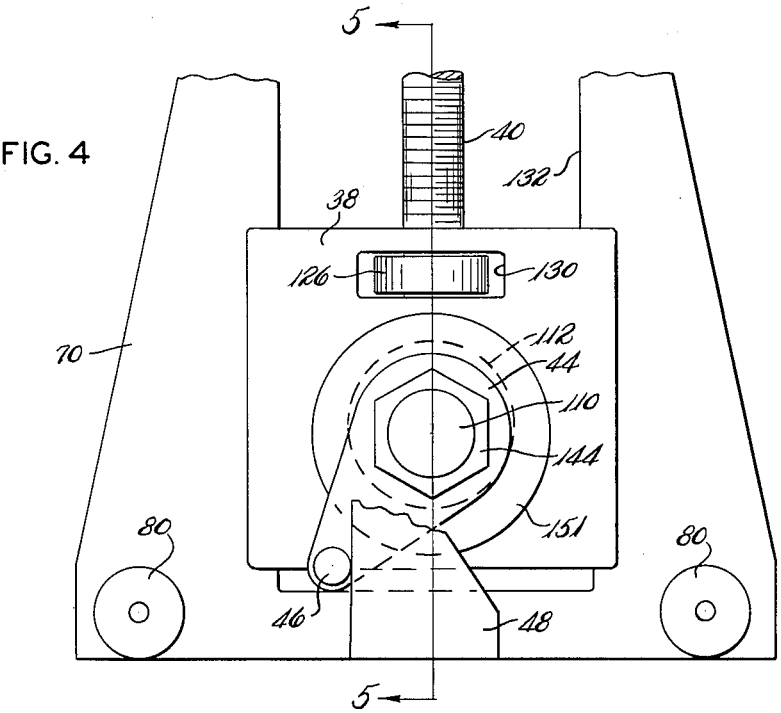
FIGURE 4 is an enlarged partially broken away view of the carriage assembly particularly showing the vertically adjustable relationship of the roller, the eccentric mounting thereof, and the automatic rotation of the shaft effected by the stop.

With respect to FIGURE 1, the invention contemplates that the initial position for the carriage assembly 30 will be substantially as illustrated which will rotate the arm 44 and actuating handle 46 to a position substantially as indicated therein, and in FIGURE 4, which in effect positions the eccentric cams 112 to carry the shaft 110 in the maximum downward position. It should be understood at this point, that any rotation of the shaft 110 by the arm 44 will cause the eccentric cams 112 to move the shaft slightly upwardly because of the eccentricity thereof. Thus, the screws 40 and 40a may be adjusted to position the roll 28 into position with relation to the bed 14 and the top surface of the die chase 18 so that the driving movement of the carriage assembly 30 by the motor 90 will cause the roll 28 to effect a pressure-contact cutting pressure as it forces the die edges through the material to be cut.

However, as the carriage assembly 30 approaches the end of its movement along the slots 32 and 34, the actuating handle 46 on the arm 44 will engage the front surface of the limit stop 50 causing a pivot of the arm 44 to turn the shaft 110 and move the shaft upwardly with relation to the slidable blocks 38 and 38a. In this manner, the roll 28 is actually moved away from the bed and out of pressure-contact cutting position. In actual practice, it is anticipated that the arm 44 will be moved through an arcuate swing of approximately 60° before an actual electrical limit stop switch (not shown) is actuated. The motor drive may then be automatically or manually reversed as for example by switch 36 to return the carriage assembly 30 to its initial position which will cause the actuating handle 46 to engage the front surface of the stop 48 swinging the arm 44 back in the opposite direction to its initial position or that shown in the drawing of FIGURES 1 and 4. This moves the shaft 110 downwardly causing the roll 28 to be moved into pressure-contact cutting position for proper cutting on the next sheet of material inserted onto the bed.

Any suitable electrical system could be used to effect the reversal to the motor 90 to drive the carriage back to its initial position with a suitable motor cut out energized upon the return to the initial position. In fact, the invention contemplates that once the carriage has returned to its initial position, a friction clutch (not shown) may be actuated to hold or lock the motor and various interrelated gear and shaft combinations into position to hold the carriage at a desired initial position. The operator may then hit an appropriate button on the actuation switch 36 to effect the next cycle.

The invention contemplates that only one pass of the roller 28 over the top or outer surface of the die chase 18 will be necessary to effect the desired cutting action. It is desirable that the roll 28 be moved up and away from actuating the die chase 18 on the return stroke as failure to do this will effect different angles of pressures on the cutter dies 20 causing slivers and minor defections to the material 24. The counterweighted die chase 18 makes it quick and easy for a single operator to rapidly and continuously cut desired patterns from materials utilizing this roller die cutter press apparatus.

Figure 6:
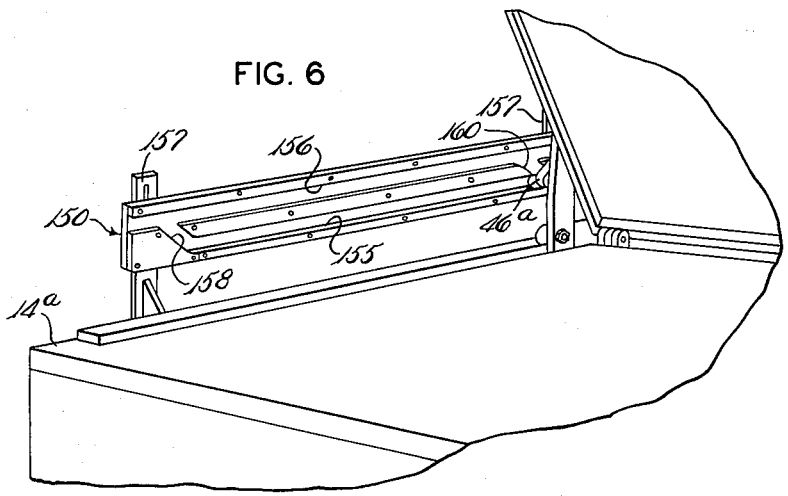
FIGURE 6 is a broken away perspective view of a positive cam track arrangement which may be utilized to securely hold the roll in position during the cutting stroke.

The operation of the up and down movement to the roller 28 by the actuating handle 46 on the arm 44 does not provide any positive means, other than friction of the interrelated parts, to insure that the roller 28 will remain in the downward actuated position during the cutting stroke thereof. In order to overcome this difficulty, the invention contemplates possible utilization of a cam track, indicated generally by numeral 150 in FIGURE 6. The cam track 150 is adjustably secured with respect to the bed 14a by means of support arms 157. The track 150 has recessed grooves 155 and 156 designed to slidably receive the actuating handle 46a which controls the up and down movement to the roller (not shown in FIGURE 6). Thus on the forward or cutting stroke the handle 46a rides in the lower groove 155 so the eccentric mounting the roller holds the roller firmly in the maximum downward cutting position. Upon reaching the end of the cutting stroke the handle 46a engages an upwardly directed groove 158 which carries it to the top or return groove 156 and moves the roller away from the bed 14a as described above. The handle 46a returns through the upper groove 156 so the roll is held in fixed position on the return stroke. A downwardly directed groove 160 returns the handle 46a to the initial starting position in the groove 155. The cam track 150 is of simple design, but offers a positive method of positioning the roller in either cutting or noncutting position, and will not allow roller drift even during cutting of the most difficult and thick stocks.

It is contemplated that an appropriate motor to reduction gear drive ratio for the carriage assembly will be utilized so that the carriage will drive at between about 50 and about 150 feet per minute, which is not sufficiently fast so that possible injury to the operator would not occur if his hands were in an improper position near the die chase when the carriage movement was actuated. It is further contemplated that the 60° swing to the arm 44 will move the roll 28 approximately 3/32 inch vertically with relation to the bed 14. Of course, because of the vertical adjustments possible in the roll 48 through the screws 40 and 40a, various cutting pressures on various strength materials can be utilized. Further, various thickness material can be used because of the vertical adjustment arrangement on the pivotal mounting of the die chase 18 in the clevis receiving pins 50.

Therefore, it is seen that the objects of the invention have been achieved by providing a simple roller die cutter press apparatus which utilizes an automatic upward movement of the roll so that material cutting is achieved only on one stroke of the carriage assembly. The cutter roll is manually adjustable to desired cutting pressure, and operator handling of the machine is greatly facilitated by the counterweight die chase so that production requirements can be greatly increased, while accuracy is to the closest tolerances. The machine is capable of continuous and steady operation because of its simple, yet sturdy construction. The counterweights on the die chase can be adjusted to compensate for various weight cutter dies, as desired.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In a roller die cutting apparatus the combination of
    a mounting frame,
    a bed operatively carried in horizontal fixed relation by the frame, a carriage mounted over the top of the bed and movable in parallel relation thereto, a roller rotatably mounted to the carriage and positioned in substantially parallel adjacent relationship to the top of the bed, means to adjust the parallel adjacent relation of the roller with respect to the top of the bed, die means pivotally mounted to one end of the frame and positionable in face to face complementary relationship to the bed, means to drive said carriage from an initial position relative to the bed the length thereof, with the die means in face to face relation to the bed with the roller in an initial position so that the roller sequentially forces the die means into a point-contact cutting relation with respect to the bed, means to limit the movement of the carriage relative to the bed, means to automatically lift the roller a short distance away from the bed after a cutting pass thereover so the carriage may be returned to the initial position without having the roller force the die means into point-contact cutting relation with the bed, and means to automatically return the roller to its initial position towards the bed when the carriage returns to its initial position.

2. In a roller die press cutting apparatus the combination of a table, a bed operatively mounted in horizontal relation by the table, a die chase pivotally mounted to one end of the table so that it is positionable in face to face complementary relation to the bed, cutting die means operatively mounted to the die chase to engage the bed when the die chase is in face to face relation with the bed, carriage means slidably mounted to the table movable back and forth over the bed, a pair of opposed eccentric cams rotatably mounted by said carriage means, elongated rotatable roller means having non-rotatable end portions mounted in keyed relationship to said eccentric cams so as to position the roller means in substantially parallel relation to the bed, means to adjust the spaced relationship of the roller means relative to the bed, means to drive the carriage relative to the bed when the die chase is in face to face relation to the bed so that the roller forces the die means carried by the die chase into cutting contact with relation to the bed, and means to rotate the cams mounting the roller means after the carriage has made one pass over the bed to move the roller means a short spaced distance away from the bed.

3. In a roller die press cutting apparatus the combination of a table, a bed carried by the table, means to position a cutter die in face to face complementary relation to the bed, a carriage supported on each end at opposite sides of the table and movable relative thereto the length thereof, a pair of eccentric cams rotatably mounted in opposed relationship on each side of the carriage and adjustable in perpendicularly spaced relation to the bed, an elongated shaft keyed at each end to a respective cam and positioned in substantially parallel adjacent relation to the bed across the width thereof, a roller rotatably carried by said shaft and extending substantially the length thereof, means to drive the carriage relative to the bed from one end thereof to the other when the cams position the shaft in a minimum spaced adjacent relation to the bed so that the roller sequentially forces the cutter die into a point-contact cutting relation with the bed, and means to rotate the shaft through an arc after the carriage has moved the length of the bed to shift the shaft away from the bed so that the carriage can return to the initial position without having the roller force the cutter die into point-contact cutting relation with the bed.

4. A roller die press cutting apparatus according to claim 3 where the eccentric cams are also adjustable and perpendicularly spaced in relation to the cutter die, where the elongated shaft is also positioned in substantially parallel adjacent relation to the cutter die across the width thereof, wherein the means to drive the carriage also drives it relative to the cutter die so the roller sequentially forces the bed into a point-contact cutting relation with the cutter die, and where the means to rotate the shaft through an arc after the carriage has moved the length of the cutter die also shifts the shaft away from the cutter die so that the carriage can return to the initial position without having the roller force the bed into point-contact cutting relation with the cutter die.

5. In comibnation, a table, a bed operatively mounted in horizontal relation by the table, a die chase pivotally mounted to one end of the table so that it is positionable in face to face complementary relation to the bed, cutting die means operatively mounted to the die chase to engage the bed when the die chase is in face to face relation with the bed, carriage means mounted in roller tracks to the table movable back and forth over the length of the bed, a pair of opposed eccentric cams rotatably mounted by said carriage means, elongated rotatable roller means having non-rotatable end portions each mounted in keyed relationship to a respective eccentric cam so as to position the roller means in substantially parallel relation to the bed, means to drive the carriage from an initial position relative to the bed when the die chase is in face to face relation to the bed to the opposite end thereof so that the roller forces the die means carried by the die chase into cutting contact with relation to the bed, means to rotate the cams mounting the roller means after the carriage is positioned at said opposite end to move the roller means a short spaced distance away from the bed, means to reverse the drive means to return the carriage to its initial position, and means to rotate the cams mounting the roller means to return the roller to its initial position after the carriage has returned to its initial position.

6. In combination a table, a bed carried by the table, means to position a cutter die in face to face complementary relation to the bed, a carriage supported on each end at opposite sides of the width of the table and movable relative thereto the length thereof, a pair of sliding block means mounted in opposed relationship on each side of the carriage and adjustable in perpendicular spaced relation to the bed, an elongated shaft keyed at each end to a respective block means and positioned in substantially parallel adjacent relation to the bed across the width thereof, a roller rotatably carried by said shaft and extending substantially the length thereof, means to drive the carriage relative to the bed from one end thereof to the other so that the roller sequentially forces the cutter die into a point-contact cutting relation with the bed, and means to move the block means away from the bed after the carriage has moved the length of the bed to shift the shaft away from the bed so that the carriage can return to the initial position without having the roller force the cutter die into point-contact cutting relation with the bed.

References Cited by the Examiner

UNITED STATES PATENTS

| | | | |
|---|---|---|---|
| 1,457,501 | 6/1923 | Cox | 83—283 |
| 1,926,983 | 9/1933 | Lamb | 83—269 |
| 3,077,807 | 2/1963 | Wright | 83—532 |

ANDREW R. JUHASZ, *Primary Examiner.*